(12) United States Patent
Emmert et al.

(10) Patent No.: US 6,600,662 B1
(45) Date of Patent: Jul. 29, 2003

(54) LIGHT GUIDE FOR A FOLDABLE ELECTRONIC DEVICE

(75) Inventors: Steven Clark Emmert, Crystal Lake, IL (US); Thomas Anthony Petrella, Burlington, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/951,149

(22) Filed: Oct. 15, 1997

(51) Int. Cl.[7] .............................. H04B 1/03; H05K 5/00
(52) U.S. Cl. ..................... 361/814; 361/752; 455/90; D14/138
(58) Field of Search ................... 361/814, 752; 455/89, 90; D14/137, 138

(56) References Cited

U.S. PATENT DOCUMENTS 5,815,570 A * 9/1998 Hnnon et al. ............... 379/428
5,857,148 A * 1/1999 Weisshappel et al. ......... 455/90

OTHER PUBLICATIONS

Roadmap: The ETACS StarTAC™ Wearable Phone, Motorola product brochure TR–304 EN, May 1996, pp. 1–16.

* cited by examiner

Primary Examiner—Jayprakash N. Gandhi
(74) Attorney, Agent, or Firm—Randall S. Vaas

(57) ABSTRACT

The present disclosure shows the placement of a light pipe or indicator 120 in the "knuckle" of the hinge of the radiotelephone. The indicator is generally centered in the knuckle and follows the curvature of the hinge. Placement of an indicator in this location allows the indicator to be viewable from the front of the handset with the top housing either opened or closed, while in use or in the charger, or from the top if the radiotelephone is carried in a shirt pocket or belt clip holster.

18 Claims, 5 Drawing Sheets

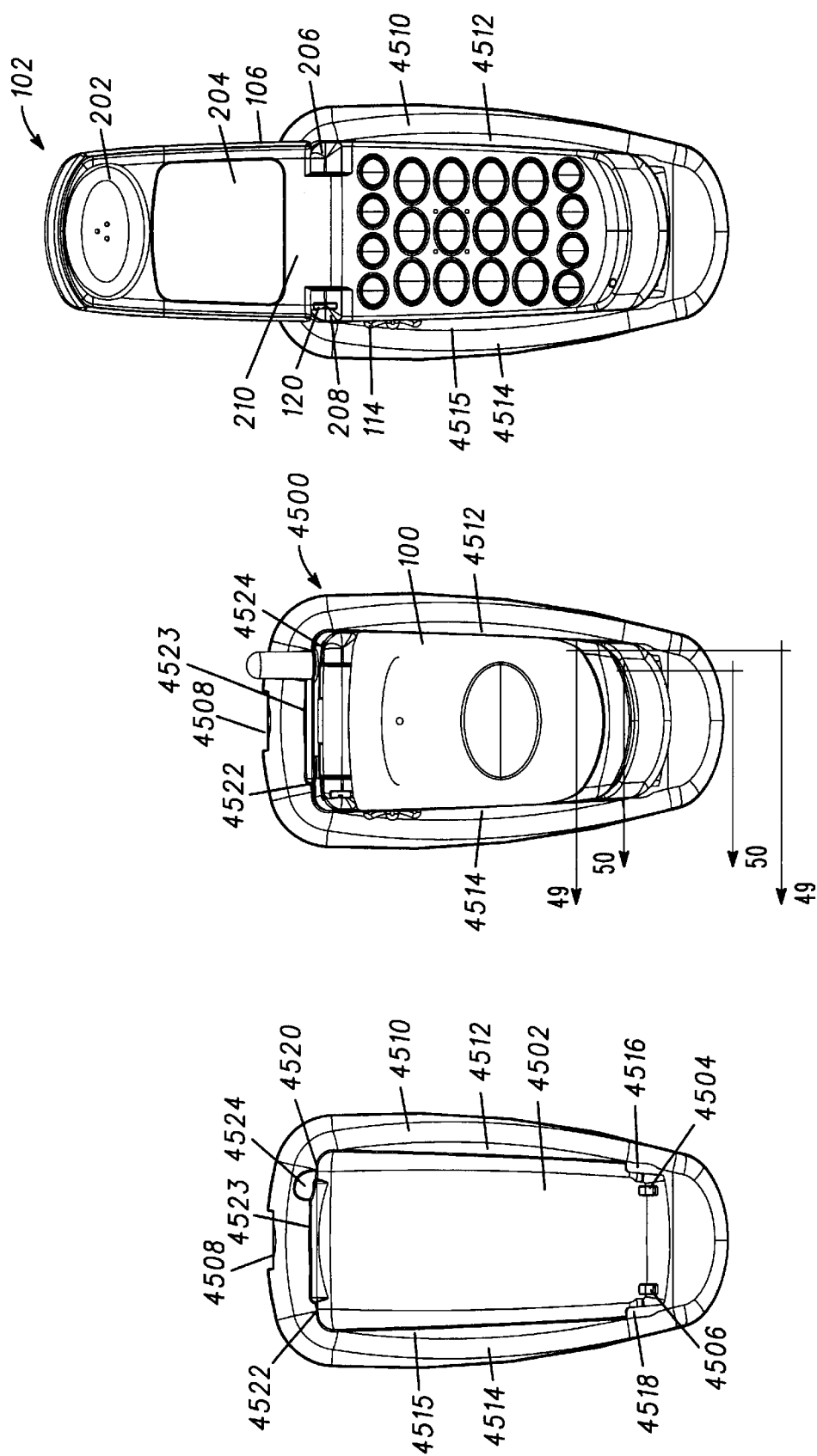

LIGHT GUIDE FOR A FOLDABLE ELECTRONIC DEVICE

FIELD OF THE INVENTION

This application is related to light guides, and more particularly to a light guide for a foldable electronic device.

BACKGROUND OF THE INVENTION

As the demand has increased for relatively small radiotelephones, one solution to the decrease in size of the radiotelephone has been to provide a foldable radiotelephone. However, with the decrease in overall dimensions of the foldable radiotelephone, other challenges are created by the foldable nature of the device. For example, an LED indicator which would normally be viewable may no longer be viewable from certian orientations. Accordingly, there is a need for a radiotelephone having a light guide or indicator which is viewable from multiple orientations of the device.

BRIEF DESCRIPTION OF THE DRAWINGS

FIG. 5 is a top plan view of charging base 4500 according to the present invention;

FIG. 6 is a top plan view of radiotelephone 100 in the closed postion in charging base 4500 according to the present invention;

FIG. 7 is a top plan view of radiotelephone 100 in the open postion in charging base 4500 according to the present invention;

DESCRIPTION OF THE PREFERRED EMBODIMENTS

The present disclosure shows the placement of a light guide or indicator in the "knuckle" of the hinge of the radiotelephone. The light guide is generally centered in the knuckle and follows the curvature of the hinge. Placement of an indicator in this location allows the indicator to be viewable from the front of the handset with the top housing either opened or closed, while in use or in the charger, or from the top if the radiotelephone is carried in a shirt pocket or belt clip holster.

Figure 1:
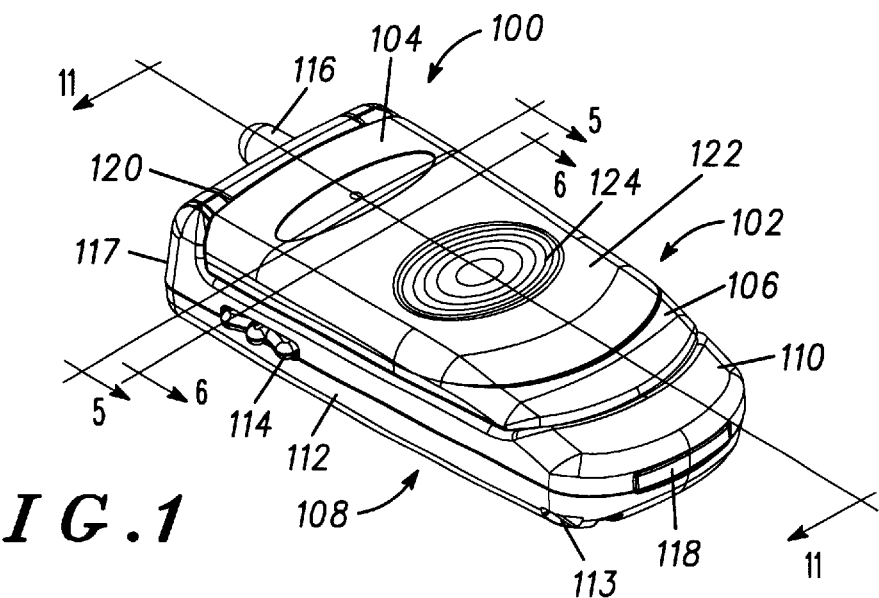
FIG. 1 is a perspective view of a radiotelephone 100 in a closed position according to the present invention.

Turning to FIG. 1, a perspective view shows a radiotelephone 100 in a closed position. Radiotelephone 100 comprises a top housing 102 having a back portion 104 and a front portion 106, and a bottom housing 108 having a front portion 110 and a back portion 112. The back portion of the bottom housing includes a first guide slot 113, which will be described in more detail in the remaining figures. The bottom housing also includes a switch assembly 114 preferably on the side of the radiotelephone and an antenna 116 generally extending from the rear 117 of the radiotelephone. A connector 118 is also provided to generally enable input/output of data or provide a port for a cigarette lighter adapter. An indicator 120, such as a light guide for a light emitting diode (LED), is incorporated in a knuckle of the hinge of the radiotelephone. Finally, back portion 104 of the top housing comprises a top surface 122 having a finger locator 124.

Figure 2:
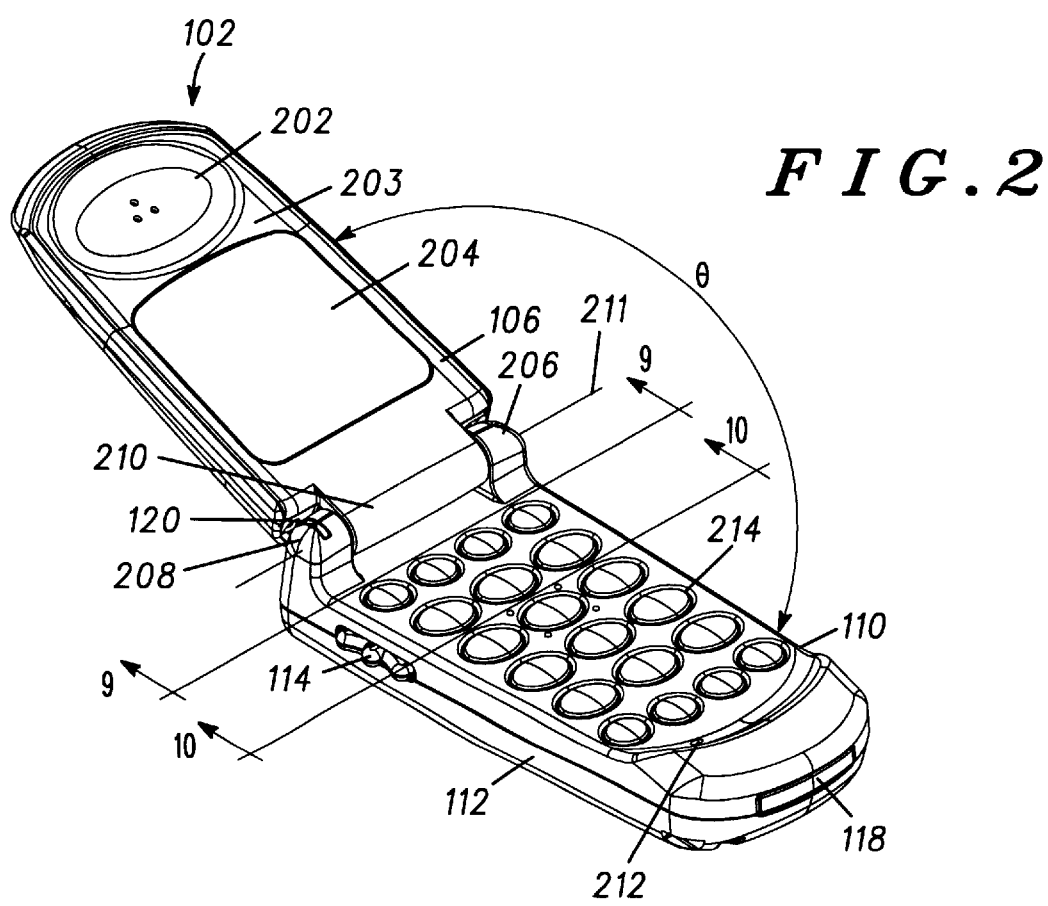
FIG. 2 is a perspective view of a radiotelephone 100 in an open position according to the present invention.

Turning now to FIG. 2, radiotelephone 100 in the open position shows seen top housing 102 hingedly connected to bottom housing 108. Front portion 106 of the top housing comprises an ear piece 202 defined in bottom surface 203 and a lens 204 positioned in an aperture in the top housing. Front portion 110 of the bottom housing comprises a first knuckle 206 and a third knuckle 208 which are coupled to a second knuckle 210 of the top housing 102. The operation of the hinge will be described in more detail in reference to the remaining figures.

Figure 3:
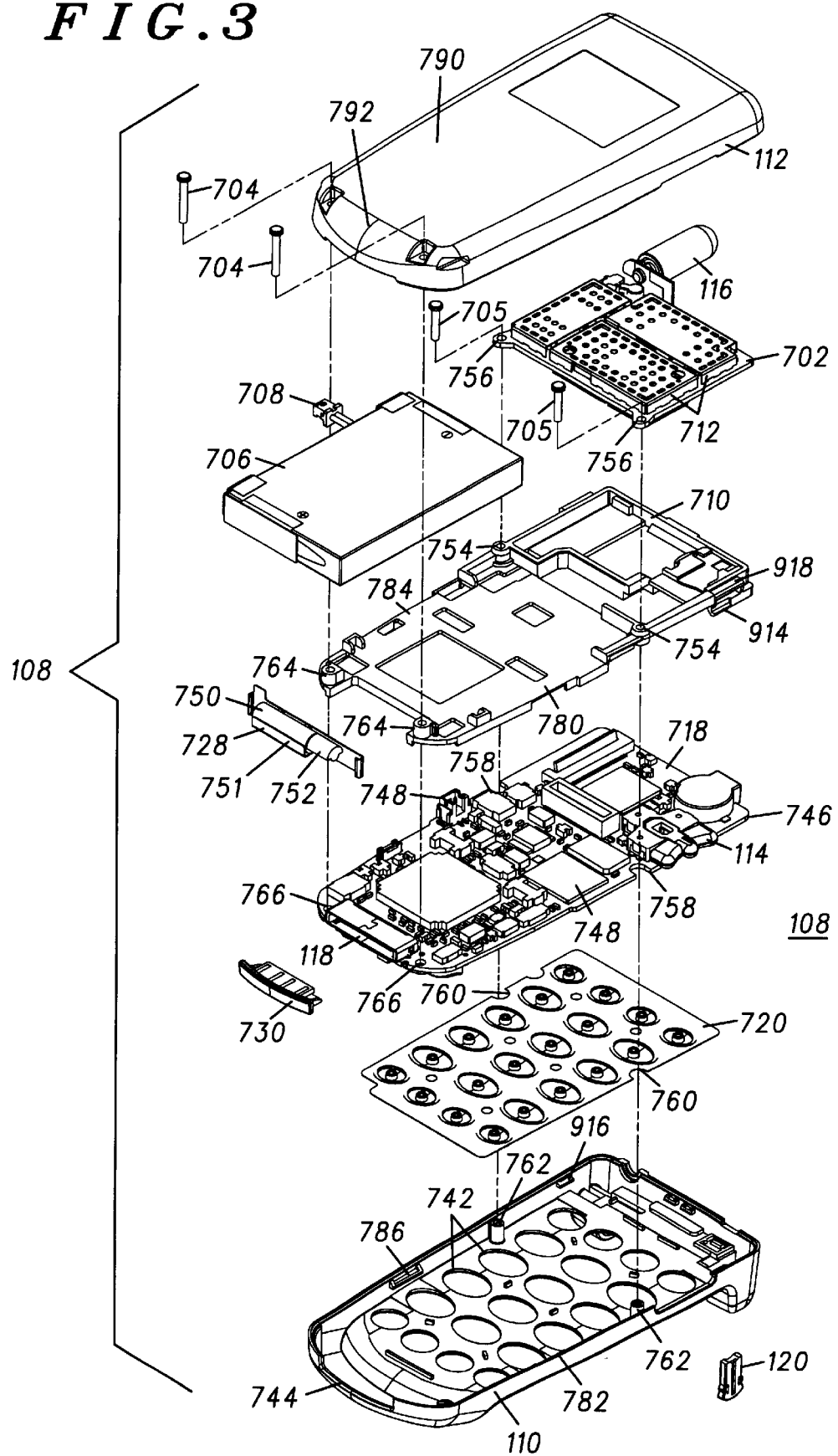
FIG. 3 is an exploded view of the bottom housing of the radiotelephone according to the present invention.

Referring now to FIG. 3, an exploded view of the bottom housing 108 of the radiotelephone 100 shows the components of the bottom housing 108. The bottom housing 108 includes the front portion 110, a keypad 720 including a plurality of keys, a logic board 718, a chassis 710, a transceiver board 702, a battery 706 and a back portion 112. The bottom housing 108 further includes a vibrator assembly 728, a data port cover 730 and the indicator 120.

The front portion 110 defines the top surface 740 of the bottom housing 108 and provides the structure which engages the top housing 102. At a first end 736, the front portion 110 includes the first knuckle 206 and third knuckle 208. The top surface defines a plurality of keyholes 742 through which extend the keys 722 of the keypad. The keyholes 742 are sized and positioned to receive the keys 722. At a second end 738, the front portion 110 defines an aperture 744 which provides access to the connector 118. The top surface of the bottom housing 108 is contoured to fit the top housing 102 when the radiotelephone 100 is folded closed.

The keypad 720 including the keys is preferably formed from a single membrane to be impervious to dirt and moisture. The keys may be arranged in any suitable configuration, including differing numbers and sizes of keys. The illustrated configuration is illustrative only. The keypad 720 rests on metal domes which provide a snap feel during key actuation.

The keypad 720 is disposed in the bottom housing 108 next to the logic board 718. The logic board 718 generally includes a printed wiring board (PWB) with components such as integrated circuits 748 attached to the PWB. The logic board 718 provides electronic functionality for the radiotelephone 100. Thus, the logic board 718 generally includes a processor or other controller which controls speech processing, timing, man-machine interface and system interface functions. Subsystems of the logic board 718 include a clock circuit which generates timing signals, a speech processor, a battery monitor including internal recharge control, memory for data storage, and input/output control.

Similarly, the transceiver board 702 controls the RF operation of the radio. The transceiver board 702 generally includes a transmitter, a power amplifier, a receiver, a duplexer or antenna switch, filters, a demodulator, a modulator and a frequency synthesizer. As is shown in FIG. 3, a portion of the circuitry on the transceiver board 702 is covered by one or more RF shields 712 to limit electromagnetic interference with surrounding circuitry.

The battery 706 in the illustrated embodiment is a self-contained, non-replaceable, rechargeable battery. The battery 706 is electrically coupled to the remainer of the radiotelephone 100 by a connector 708 which plugs into a suitable receptacle 748 on the logic board 718. In alternative embodiments, the battery 706 may be replaceable, for example, by removing a panel and disconnecting the battery 706. In the present embodiment, a non-removable battery was chosen to reduce the size of the radiotelephone 100 while maximizing the physical size and storage capacity of the battery 706. If the battery is removable, the battery 706 must be encased in a protective plastic housing, which limits the volume available for storage cells of the battery. Using a non-removable battery without a protective plastic case maximizes the volume used for storage cells and thereby maximizes the storage capacity of the battery 706.

The vibrator assembly 728 includes a motor 750 and a cam 752 and a vibrator bracket 753. To provide a silent alert, in lieu of or in addition to an audible ringer tone, the radiotelephone 100 under control of the logic board 718 turns on the motor 750 to turn the cam 752. When rotated, the unbalanced shape of the cam 752 produces a vibration sensation which alerts the user of an incoming call or other condition. The vibrator motor 750 is disposed on the vibrator bracket 751. The vibrator bracket 751 is located on and retained by one or more bosses so that the vibrator assembly rests on top of connector 118 (as viewed in FIG. 8). Thus, the vibrator assembly 728 is contained within the bottom housing 108 without occupying any space on the logic board 718.

The data port cover 730 fits in the aperture 744 formed by the front portion 110 to cover and protect the connector 118. In alternative embodiments, the data port cover 730 may be retained by a lanyard or other means to prevent loss.

A pair of screws 705 retains the transceiver board 702, the chassis 710, the logic board 718 and the keypad 720 with the front portion 110. The transceiver board 702 includes grommets 756 which engage the heads of the screws 705. The chassis 710 includes grommets 754 through which the screws 705 pass. Similarly, the logic board 718 includes cutouts 758 and the keypad includes cutouts 760 which engage the screws 705. The front portion 110 includes threaded retainers 762 which receive and retain the screws 705.

A second pair of screws 704 retains the back porton 112, the chassis 710 and the logic board 718. The screws 704 are inserted through the back portion 112 and extend through bosses 764 of the chassis 710. The threaded ends of the screws 704 are then inserted in holes 766 of the logic board 718 to complete the assembly.

Figure 4:
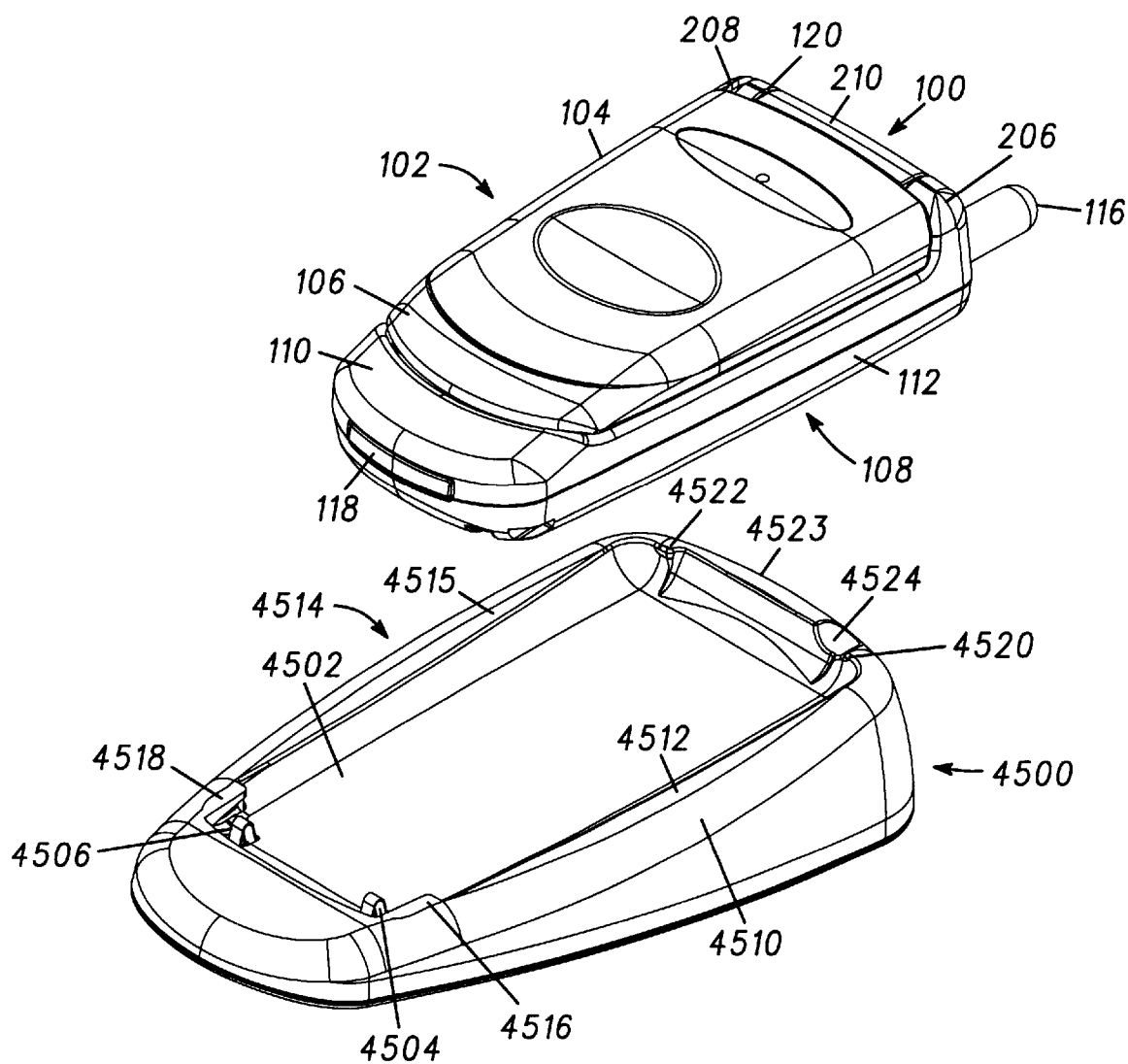
FIG. 4 is an exploded view of radiotelephone and a charging base 4500 according to the present invention.

Turning now to FIG. 4, an exploded view of radiotelephone 100 and a charging base 4500 is shown. As will be described in more detail, the novel structure of charging base 4500 enables the radiotelephone 100 to be dropped into charging base 4500, allowing gravity and the shape of the pocket to guide the radiotelephone into its proper location. The charging base preferably includes a recessed area 4502 which substantially matches the shape of the bottom housing 108 of radiotelephone 100, and is inclined at approximately 7° above horizontal, although other angles could be employed depending upon the weight of the radiotelephone, the coefficient of friction of the materials of the radiotelephone and charging base, and other factors. Charging base 4500 includes a first charging contact 4504 and a second charging contact 4506 for providing a charging current to corresponding charging contacts of radiotelephone 100. Charging base 4500 further includes a first side wall 4510 having a beveled edge 4512 and a second side wall 4514 having a similar beveled edge 4515 for guiding radiotelephone 100 into recessed area 4502. A first guide tab 4516 and a second guide tab 4518 are positioned near the lower end of the charging base to engage the corresponding guide slots of the radiotelephone. The operation of the guide tabs and guide slots will be described in more detail in reference to FIG. 8. Finally, a first rear wall portion 4520 and a second rear wall portion 4522, with a antenna recess 4524 define a recess for receiving the radiotelephone when the rear of the radiotelephone clears the rear wall portions. Although the center rear wall portion is shown slightly behind the first and second rear wall portions, a single rear wall portion extending across the back of the charger could be incorporated according to the present invention.

In operation, guide elements on the charging base are used to engage corresponding guide elements in the radiotelephone to ensure that the contacts on the radiotelephone are held against contacts on the charging base at all times. Preferably, the first guide tab and the second guide tab of the charging base couple with a first guide slot and the second guide slot respectively of the radiotelephone, forcing contacts of the radiotelephone against the first and second charging contacts when the rear of radiotelephone 100 clears the first rear wall portion 4520 and second rear wall portion 4522. When the rear of the radiotelephone falls into the charging pocket, the radiotelephone is securely positioned in the charging base as shown in FIG. 6, and the radiotelephone is not dependent upon gravity to maintain contact between the charging contacts of the radiotelephone and the charging contacts of the charging base.

The novel shape of charging base 4500 and the shape of back portion 112 of the bottom housing enables easy insertion of the radio telephone into the charging base. In particular, the rear wall portion including center rear wall portion 4523 provides an incline for the radio telephone when contoured edge 792 makes contact with recessed area 4205 and outer surface 790 makes contact with center rear wall portion 4523. Because recessed area 4205 is generally inclined, and the radio telephone when positioned on the recessed area and center rear wall portion is generally inclined, the radio telephone slides towards the guide tabs of the charging base.

In particular, because outer surface 790 and contoured edge 792 of the back portion are generally concave, radiotelephone 100 moves along recessed area at a contact point of the contoured edge. The contact point is generally less than the entire width of the contoured edge, and reduces the friction as the radio telephone slides along the recessed area. Similarly, because center rear wall portion 4523 of the charging base is slightly convex and the outer surface 790 of the radio telephone is convex, radio telephone 100 rides along center rear wall portion at a contact point of outer surface 790. Accordingly, the radio telephone generally slides along a contact point of the recessed area and a contact point of the center rear wall portion, which depend upon the amount of curvature, minimizing the amount of friction when the radiotelephone slides into the charger. Minimizing the amount of friction reduces the amount of incline of the recessed area and/or the height of the rear wall. Further, if the radio telephone is not perfectly aligned in the charger housing during insertion, the beveled edges of the side walls of the charging base help direct the radio telephone into the recessed area, while the side walls generally act to align the radio telephone within the recessed area.

As is also apparent in FIG. 6, indicator 120 is visible when the phone is in the charging base, enabling viewing of the charging status when charging. Indicator 120 is also visible when the folded radiotelephone is placed in a shirt pocket, providing a status of the phone. Indicator 120 could be, for example, a multi-color LED providing an indication of IN USE, ROAM, NO SVC, or other states which are commonly known in the wireless communications industry. As shown in FIG. 7 with the radiotelephone in the open position, indicator 120 is also visible to show a charging status of the radiotelephone. Because indicator 120 is generally centered in the knuckle and follows the curvature of the hinge, indicator 120 is viewable from the front of the handset with the top housing either opened or closed.

Figure 8:
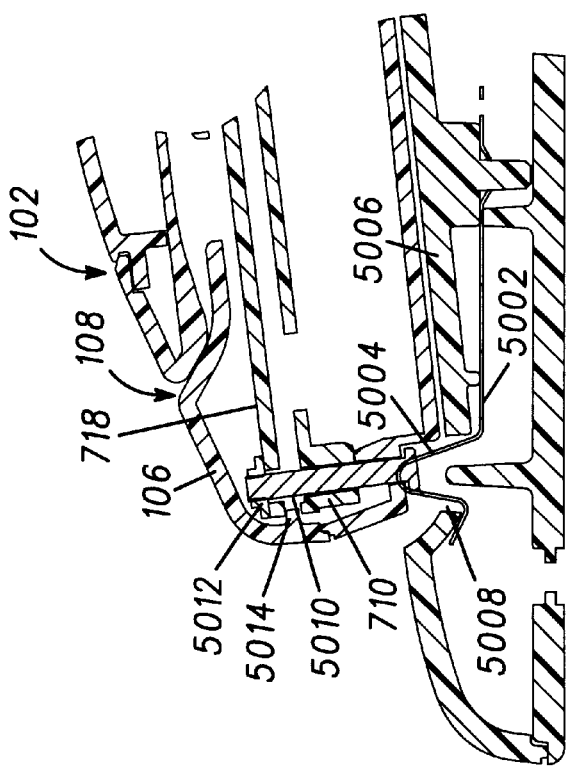
FIG. 8 is a cross-sectional view of the radiotelephone and charging base of FIG. 7 taken at lines 49—49 according to the present invention.

Turning now to FIG. 8, a cross section taken at lines 49—49 of FIG. 6 shows the coupling of first guide tab 4516 of the charging base with second guide slot 4526 of the radiotelephone. The corresponding guide tabs and guide slots are shaped to enable the coupling of the radiotelephone and the charging base. In particular, a narrow portion 4902 of first guide tab 4516 generally extends to a wide portion 4904. The corresponding second guide slot 4526 generally extends from a wide portion 4906 to a narrow portion 4908. As narrow portion 4902 of the first guide tab is advanced toward narrow portion 4908 of the second guide slot, the guide tab and the guide slot help properly orient the radiotelephone in the charging base to enable charging, as described in reference to FIG. 9.

Figure 9:
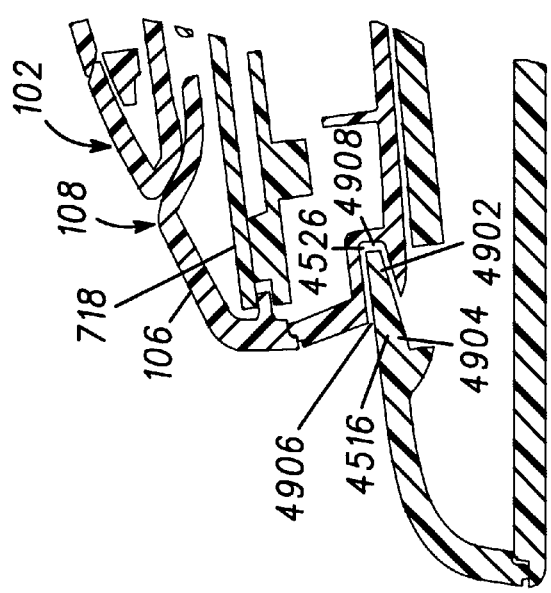
FIG. 9 is a cross-sectional view of the radiotelephone and charging base of FIG. 7 taken at lines 50—50 according to the present invention.

Turning now to FIG. 9, a cross section of FIG. 6 taken at lines 50—50 shows the charging contact arrangement according the present invention. In particular, a charging contact 5002 has a contact portion 5004 which extends through recess wall 5006 at a contact aperture 5008. Contact portion 5004 makes contact to a contact screw 5010 to enable charging of the radiotelephone. As is apparent, the head of contract screw 5010 is exposed to allow charging by the charging base. Preferably, a board contact 5012 is soldered to logic board 718. Board contact 5012 eliminates the need for an additional charging contact by utilizing the screws that hold the phone together as a connection point for charging. The board contact also eliminates the need for a threaded insert which would normally be welded into the plastic housing and has certain height requirements. Because board contact 5012 is soldered onto the logic board, the design of the board contact is shorter than an insert, allowing for a more compact design. The logic board is assembled in front portion 106 and retained by undercuts 5014 in the front housing, allowing retention force of the screws to act on the front and rear housing.

In summary, the present disclosure shows the placement of a "light pipe" in the "knuckle" of the hinge of the radiotelephone. The light pipe is generally centered in the knuckle and follows the curvature of the hinge. Placement of an indicator in this location allows the indicator to be viewable from the front of the handset with the top housing either opened or closed, while in use or in the charger, or from the top if the radiotelephone is carried in a shirt pocket or belt clip holster.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable cellular radiotelephones, the invention could be applied to any wireless communication device, including pagers, electronic organizers, or computers. Applicants' invention should be limited only by the following claims.

We claim:

1. A communication device having housing elements which are movable between a closed position and an opened position, said communication device comprising:

a first housing portion having a hinge element and a front portion spaced from the hinge element; and a light guide positioned on the hinge element to be viewable from the front portion when said housing elements are moved between said closed position and said opened position.

2. The communication device of claim 1 wherein said hinge element comprises a knuckle.

3. The communication device of claim 1 wherein said light guide follows the curvature of said hinge.

4. The communication device of claim 1 wherein said first housing portion comprises a keypad.

5. The communication device of claim 4, further comprising a second housing portion rotatably coupled by the hinge element to the first housing, wherein said second housing portion covers said keypad in the closed position.

6. The communication device of claim 1 wherein said first housing portion further comprising an antenna.

7. The communication device of claim 5, wherein said second housing portion comprises a display.

8. The communication device of claim 5, wherein said second housing further comprises an ear piece.

9. The communication device of claim 1 wherein said light guide is coupled to a multi-colored light emitting diode.

10. The communication device of claim 9 wherein said multi-colored light emitting diode shows an operation state and a charging status.

11. A communication device being movable between open and closed positions, the communication device comprising:

a first housing comprising first and second spaced knuckles and a front portion spaced from said first and second spaced knuckles, said first spaced knuckle having an opening;

a circuit board positioned in said first housing;

a light emitting device coupled to said circuit board and positioned beneath the opening of the first spaced knuckle;

a second housing, said first and second spaced knuckles aligned along an axis of rotation of said first and second housings;

a hinge rotatably coupling said first and second housings; and a light guide positioned in the opening of said first spaced knuckle to be viewable from the front portion when the communication device is moved between the open and closed positions.

12. The communication device of claim 11 wherein said first spaced knuckle has a curved surface, and said light guide has a curved end, said curved end substantially flush with said curved surface.

13. The communication device of claim 11 wherein said light emitting device is a light emitting diode.

14. The communication device of claim 11 wherein said light guide is an insertable piece.

15. A communication device having front and rear sides and being movable between open and closed positions, the communication device comprising:

a first housing comprising first and second spaced knuckles, said first spaced knuckle having a opening;

a circuit board positioned in said first housing;

a light emitting device coupled to said circuit board and positioned beneath the opening of the first spaced knuckle;

a second housing comprising a third knuckle, said third knuckle aligned between said first and second spaced knuckles and along an axis of rotation of said first and second housings;

a hinge partially disposed in the third knuckle and rotatably coupling said first and second housings; and a light guide positioned in the opening of said first spaced knuckle, said light guide, during operation of the communication device, illuminated by said light emitting device and viewable from said front side of the communication device when the communication device is in the open and closed positions.

16. The communication device of claim 15 wherein said first spaced knuckle has a curved surface, and said light guide has a curved end, said curved end substantially flush with said curved surface.

17. The communication device of claim 15 wherein said light emitting device is a light emitting diode.

18. The communication device of claim 15 wherein said light guide is an insertable piece.

\* \* \* \* \*